United States Patent
Geyer et al.

(10) Patent No.: US 6,249,110 B1
(45) Date of Patent: Jun. 19, 2001

(54) CIRCUIT CONFIGURATION FOR GENERATING A STABILIZED POWER SUPPLY VOLTAGE

(75) Inventors: Hans Geyer, Mutlangen; Thomas Spichale, Schoenbrunn, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/549,112

(22) Filed: Apr. 13, 2000

(30) Foreign Application Priority Data

Apr. 16, 1999 (DE) ................................ 199 17 204

(51) Int. Cl.[7] ........................... G05F 1/44; G05F 1/56
(52) U.S. Cl. ................................. 323/272; 323/269
(58) Field of Search ............................ 323/268, 269, 323/271, 272

(56) References Cited

U.S. PATENT DOCUMENTS

| | | | |
|---|---|---|---|
| 3,600,667 | 8/1971 | Wynn | 323/269 |
| 4,535,282 | * 8/1985 | Nguyen | 323/269 |
| 4,611,162 | * 9/1986 | Erratico et al. | 323/269 |
| 5,025,203 | * 6/1991 | Edwards | 323/268 |
| 5,258,701 | * 11/1993 | Pizzi et al. | 323/269 |
| 5,587,648 | * 12/1996 | Jinbo et al. | 323/269 |
| 5,602,464 | * 2/1997 | Linkowsky et al. | 323/272 |
| 5,973,484 | * 10/1999 | Cho | 323/269 |

FOREIGN PATENT DOCUMENTS

| | | |
|---|---|---|
| 20 07 694 | 3/1978 | (DE) . |
| 18977 | 7/1983 | (DE) . |
| 33 35200 | 4/1985 | (DE) . |
| 29 33 029 | 2/1990 | (DE) . |

* cited by examiner

Primary Examiner—Peter S. Wong
Assistant Examiner—Bao Q. Vu
(74) Attorney, Agent, or Firm—Kenyon & Kenyon

(57) ABSTRACT

In a circuit configuration for generating a stabilized power supply voltage, an in-phase regulator LR and a switched-mode regulator SR are connected in parallel to one another and are between terminal A1 where the input voltage is supplied and terminal A2 where stabilized output voltage UA is obtained. The regulators are adjusted so that in the normal case, the output voltage of switched-mode regulator SR is slightly higher than that of in-phase regulator LR.

4 Claims, 1 Drawing Sheet

CIRCUIT CONFIGURATION FOR GENERATING A STABILIZED POWER SUPPLY VOLTAGE

FIELD OF THE INVENTION

The present invention relates to a circuit configuration for generating a stabilized power supply voltage, and in particular the voltage supply for consumers in automotive electrical systems.

BACKGROUND INFORMATION

The electric power supply for consumers in a motor vehicle makes special demands on the voltage regulator used because the on-board voltage fluctuates in a relatively wide range and drops significantly when heavy loads are switched on, for example. Especially when starting the engine, as long as the starter is in operation, these voltage drops may be considerable. In supplying electric power to voltage-sensitive consumers such as a controller or a microprocessor and especially in supplying electric power to an automotive PC to be used in future motor vehicles, it is necessary to ensure that no voltage drop will be so great as to lead to a reset of the controller or the PC.

One possibility of supplying a stabilized power supply voltage for controllers or other voltage-sensitive consumers is to use complex switched-mode power supplies. Such switched-mode power supplies are necessary to minimize the resulting power loss, but when starting the engine, it can nevertheless occur that there is a great dip in the power supply voltage; in this case, the switched-mode power supply parts are shut down and cause an unwanted reset of the PC.

A circuit configuration for generating a power supply voltage which protects sensitive electronic consumers such as microprocessors but will also shut down when the voltage is too low is described in German Patent No. 33 35 200. With this power supply voltage circuit, two downstream voltage converters are used, making available an unstabilized consumer voltage as well as a stabilized consumer voltage. The unstabilized consumer voltage is generated in a separate voltage converter and is used as the input voltage for the downstream second voltage converter which includes a voltage regulator. Both voltage converters are active at the same time. In addition, there is a low voltage detection which shuts down the consumer when the power supply voltage drops below an allowed minimum level.

SUMMARY OF THE INVENTION

An object of the present invention is to expand the input voltage range with a circuit for generating a stabilized power supply voltage for voltage-sensitive consumers such as microprocessors, thereby preventing the microprocessor or automotive PC to be supplied with power from being shut down and then having to be rebooted when a low voltage level occurs at the input of the circuit configuration.

The circuit configuration according to the present invention for generating a stabilized power supply voltage has the advantage that the working range in which the circuit can operate has been greatly expanded in comparison with traditional voltage stabilizer circuits and this prevents the consumers such as microprocessors or automotive PCs which are to be supplied with power from being shut down when the voltage is very low.

These advantages are achieved by connecting an in-phase regulator in parallel with a switched-mode regulator between the supply voltage input and the output and selecting the dimensions of the in-phase regulator and the switched-mode regulator so that the in-phase regulator is responsible for the power supply voltage at lower voltage levels and at the higher voltages which are usually available, the switched-mode regulator is responsible for supplying the voltage, and it turns itself off when the voltage drops too far.

The circuit configuration according to the present invention can be used in an especially advantageous manner in a motor vehicle for supplying power to voltage-sensitive consumers, in particular controllers or PCs.

The circuit configuration according to the present invention having the two parallel regulators is an advantageous parallel system which also serves to reduce the probability of failure because a power supply with a somewhat stabilized power supply voltage is guaranteed even in the event of failure of one of the two regulators.

DETAILED DESCRIPTION

Figure 1:
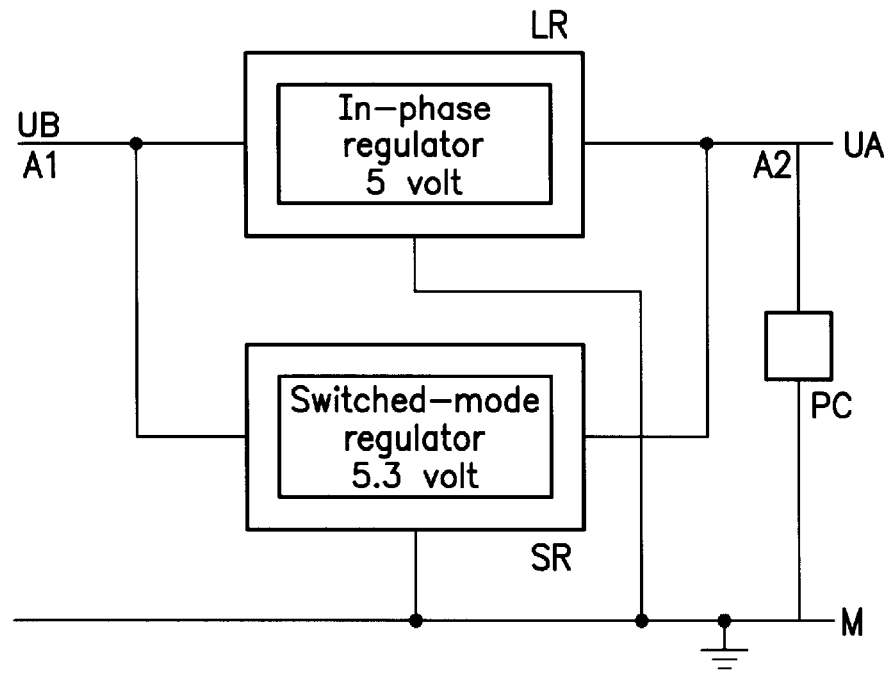
FIG. 1 shows a circuit configuration according to the present invention.

FIG. 1 illustrates one embodiment of a circuit configuration for generating a stabilized power supply voltage. This circuit configuration may be used, for example, to supply power to a controller in a motor vehicle or to supply power to an automotive PC or to supply power to other voltage-sensitive consumers which require a stabilized power supply voltage.

Terminal A1 of the circuit configuration receives voltage UB, e.g., the battery voltage or on-board voltage. This voltage is known to drop greatly when heavy consumers are started, in particular when the started is turned on. The voltage also depends on the charge of the battery (not shown) as well as the prevailing temperature. This voltage is to be converted with the help of the downstream circuit configuration into a regulated output voltage ua which is used to supply power to the consumers, e.g., to supply power to an automotive controller or an automotive PC. The consumers are symbolized by the notation PC. The output of the circuit configuration at which voltage UA can be picked up is labeled as A2.

In-phase regulator LR is between terminals A1 and A2 and ground terminal M, and switched-mode regulator SR is connected parallel to the former. In-phase regulator LR is, for example, a stabilizer IC with a 5 V output voltage. The control voltage of switched-mode regulator SR is set at 5.3 V, for example.

Figure 2:
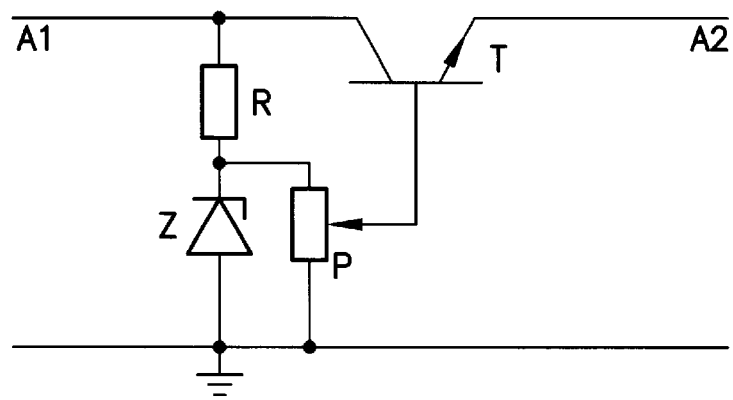
FIG. 2 shows an example of a circuit for an in-phase regulator.

FIG. 2 shows a known example of an in-phase regulator. With this circuit, in-phase transistor T is between terminals A1 and A2. The reference voltage is set with the aid of a Zener diode Z. The output voltage of the in-phase regulator can be set with the help of resistor R and a variable resistor such as a potentiometer P.

Instead of the example of an in-phase regulator illustrated in FIG. 2, other in-phase regulators may also be used. It is important only that an in-phase transistor T is between A1 and A2.

With the help of in-phase regulator LR, which is installed in the voltage supply system in parallel with switched-mode regulator SR, the input voltage range of the circuit can be lowered to approximately 6 V. Thus, up to an input voltage of 6 V, desired output voltage UA can be delivered. At input voltages above 8 V, switched-mode regulator SR is responsible for the power supply, such as the power supply to the PC connected at terminal A2. Below the threshold of 8 V, switched-mode regulator SR cannot operate correctly and shuts itself down. At an input voltage of 8 V to 6 V, in-phase regulator LR is responsible for supplying power to the PC. The power loss of the circuit configuration described here is no greater than that with traditional switched-mode power supplies.

In order for in-phase regulator LR not to carry current at an input voltage of more than 8 V, a potential difference must be established between the output voltages of in-phase regulator LR and the switched-mode regulator. This potential difference is maintained when an in-phase regulator with a 5 V output is used and the control voltage of switched-mode regulator SR is set at 5.3 V. Then in the normal case, the output voltage is 0.3 V higher than the control voltage of in-phase regulator LR. The control circuit thus shuts down in-phase transistor T in in-phase regulator LR, thereby ensuring that the power loss remains low.

Since the circuit configuration having the two parallel regulators, in-phase regulator LR and switched-mode regulator SR is a parallel system, a relatively stable power supply voltage can still be provided for the downstream electric consumers even in the event of failure of one regulator, thereby optimizing the reliability of the power supply voltage for the consumers, such as an automotive PC.

What is claimed is:

1. A circuit configuration for generating a stabilized power supply voltage for an electronic consumer in a motor vehicle, comprising:
   an input terminal;
   an output terminal; and
   a voltage regulator receiving an input voltage supplied at the input terminal and providing, at the output terminal, a regulated output voltage to supply the consumer, the voltage regulator including an in-phase regulator and a switched-mode regulator coupled in parallel to one another, a predefined potential difference being obtained between an output voltage of the in-phase regulator and an output voltage of the switched-mode regulator.

2. The circuit configuration according to claim 1, wherein an output voltage of the in-phase regulator is lower than an output voltage of the switched-mode regulator, and wherein the potential difference is about 0.3V.

3. The circuit configuration according to claim 1, wherein the in-phase regulator is an integrated voltage regulator with a 5V output voltage, and wherein the switched-mode regulator has a control voltage set at about 5.3V.

4. The circuit configuration according to claim 1, wherein the circuit configuration is contained in an automotive electrical system, the input voltage is one of a battery voltage and an on-board voltage, the regulated output voltage supplies power to an on-board consumer, and wherein the on-board consumer includes one of a controller and an automotive PC.

* * * * *